Jan. 17, 1961 P. E. DAVIS 2,968,355
MULCHING MACHINE
Filed June 24, 1957
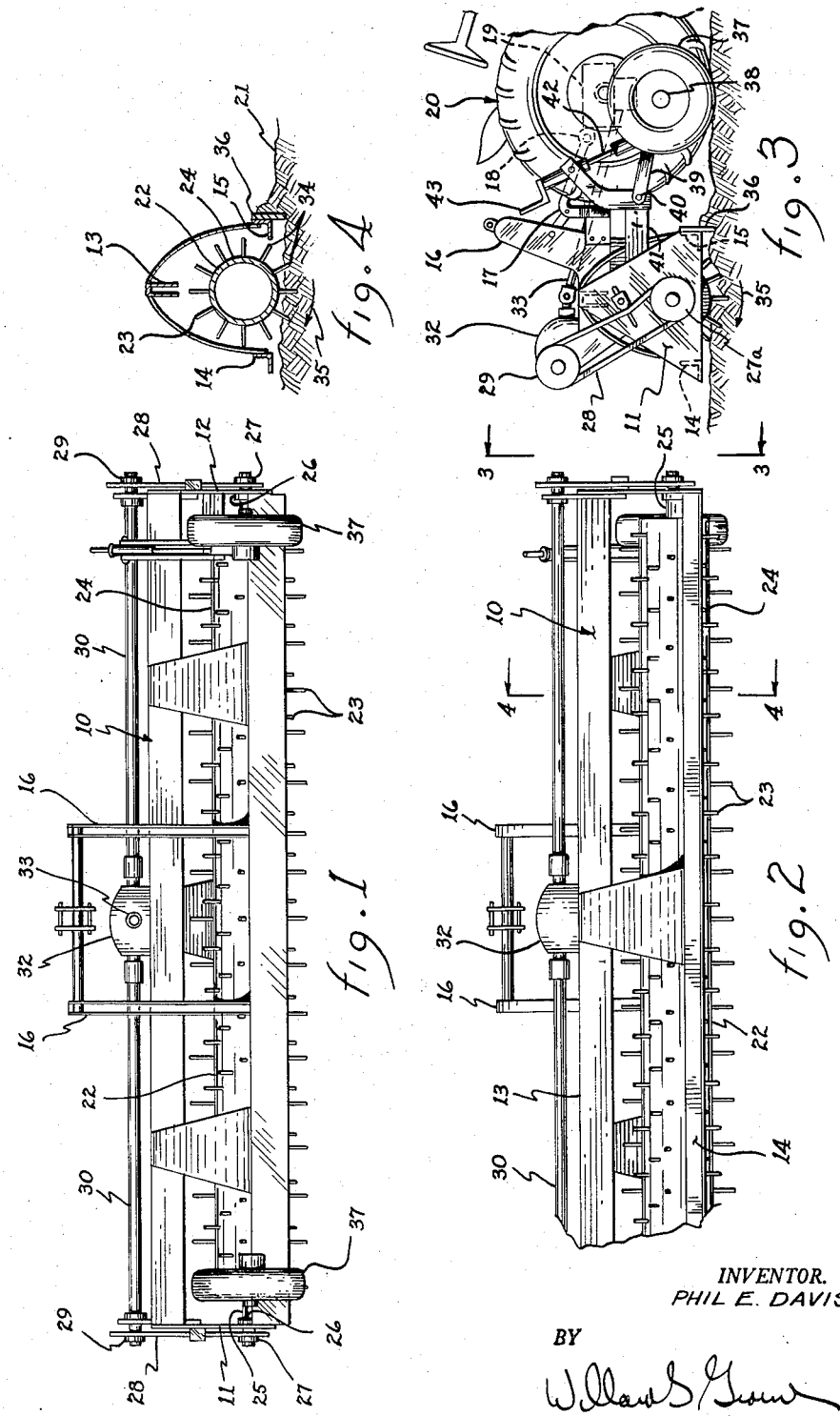
INVENTOR.
PHIL E. DAVIS
BY
ATTORNEY

2,968,355

MULCHING MACHINE

Phil E. Davis, 922 W. 4th Ave., Mesa, Ariz.

Filed June 24, 1957, Ser. No. 667,631

3 Claims. (Cl. 172—63)

This invention pertains to a farm implement for mulching the ground surface of a field preparatory to seeding and planting.

One of the objects of this invention is to provide an improved rotary mulching machine of simple rugged construction and high operating efficiency.

Still another object of this invention is to provide a mulching machine having a transverse horizontally disposed cylinder provided with radially outwardly projecting ground engaging pegs extending helically the length of the cylinder.

A further object is to actuate the aforementioned cylinder so that the peripheral speed of the outer ends of the pegs is greater than and opposite to the rate and direction of travel of the cylinder along the ground surface.

It is also an object to provide a scraper bar in front of said cylinder to initially level the ground surface before mulching treatment by the pegged cylinder.

Further features and advantages of this invention will appear from a detailed description of the drawings in which:

Fig. 1 is a front elevation of a mulching machine incorporating the features of this invention.

Fig. 2 is a fragmentary rear elevation of the apparatus shown in Fig. 1.

Fig. 3 is a right hand end elevation of the apparatus shown in Fig. 2.

Fig. 4 is a section on the line 4—4 of Fig. 2.

As an example of one embodiment of this invention there is shown a mulching machine comprising a frame 10 consisting of end plates 11 and 12 connected together by the upper tie bar 13 and the lower rear tie bar 14 and the lower front tie bar 15. Support arms 16 are suitably fixed to the tie bars and are fixed to the links 17 which in turn are pivotally supported at 18 on the housing 19 of the supporting tractor 20 and suitable means (not shown) are provided to swing the links 17 about the pivot 18 as is usual for such tractors for raising and lowering the frame 10 relative to the ground surface 21.

The mulching cylinder 22 has a series of radially outwardly extending ground engaging pegs 23 projecting from its periphery 24. The cylinder 22 is fixed to a shaft 25 journaled in suitable bearings 26 and 27 in the respective end plates 11 and 12. On the outer ends of the shaft 25 are fixed the chain sprockets 27a over which operate the roller chains 28 which in turn are driven by the sprockets 29 fixed to the drive shafts 30 journaled in suitable bearings 31 in the end plates 11 and 12. The inner ends of the shafts 30 are connected to be driven by a suitable differential transmission gearing (not shown) contained in the gear case 32 fixed on the frame 10, a power input shaft 33 being suitably connected to the power take-off of the tractor for driving the cylinder 22 through the recited drive train. The cylinder 22 is driven in the direction indicated by the arrow 35 at a speed such that the peripheral speed of the outer ends 34 of the pegs 23 is greater than the forward speed of the tractor 20 over the ground surface 21 so as to flick up the soil surface in a rearward direction to thoroughly mulch the ground preparatory to planting.

A transverse scraper blade 36 which may be vertically adjustably mounted on the lower front tie bar 15 in front of the peg studded cylinder 22 initially levels the clods and furrows preparatory to working of the mulching operation by the cylinder 22.

A pair of ground engaging wheels 37 are journaled at 38 on the front ends of the links 39 pivotally connected at their other ends 40 to the bracket 41 rigidly fixed to the frame 10. An adjusting screw 42 operated by a crank handle 43 serves to adjust the wheels 37 up-and-down about the pivot 40 so as to position the cylinder 22 and blade 36 a desired height relative to the ground surface 21. The ground engaging wheels 37 are substantially in transverse alignment with the tractor wheels and in front of the blade 36 and the cylinder 22 determine the proper operating depth for these members independent of the tractor, since the tractor lift mechanism 17—18 is ordinarily rendered ineffective during the normal mulching operation. Usually with properly prepared soil, the mulching cylinder peg ends 34 are located below the normal ground level 21 while the lower edge of the scraper blade 36 is above the position of the ends 34 and below the ground level 21 contacted by the wheels 37.

As the above described apparatus is moved over the field surface 21, the scraper blade initially levels any remaining furrows and excessive unevenness is removed. The rapidly rotating mulching cylinder then loosens and flicks up the soil providing a fine mulched surface ready for seeding and planting.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. A mulching machine comprising a power driven vehicle having transversely aligned support wheels, a frame, means carried by said power driven vehicle for pivotally supporting said frame rearwardly thereon for relative vertical movement to and from the ground surface, a transverse horizontal scraper blade fixed on the front of said frame, a horizontally disposed mulching cylinder journaled at each end to rotate about a fixed horizontal transverse axis on said frame, a series of helically arranged radially outwardly extending ground engaging pegs fixed to the periphery of said mulching cylinder, a power transmission mounted on said frame driven from the power take-off of said vehicle and connected to each end of said cylinder to revolve said cylinder with the outer ends of said pegs engaging the ground surface at a greater peripheral speed than the forward travel of said vehicle to flick soil rearwardly of said cylinder, ground contacting wheels journaled on said frame and mounted for vertical relative movement of said frame located substantially transversely aligned with said support wheels and in front of said scraper blade and means acting between said frame and said wheels for adjustably positioning said ground contacting wheels relative to said frame.

2. In a mulching machine as set forth in claim 1 wherein said ground contacting wheels provide the sole means for vertically positioning said scraper bar and cylinder relative to the ground surface to be mulched.

3. In a mulching machine as set forth in claim 1 wherein said power transmission includes a gear case located on said frame intermediate the ends thereof, drive shafts extending transversely from said gear case to the sides of said frame, and drive chains from the ends of said drive shafts to the ends of said mulching cylinder.

References Cited in the file of this patent

UNITED STATES PATENTS

| | | |
|---|---|---|
| 1,409,832 | Cook | Mar. 14, 1922 |
| 1,795,182 | Ross | Mar. 3, 1931 |
| 2,288,110 | Schmeiser | June 30, 1942 |
| 2,442,731 | Paul | June 1, 1948 |
| 2,526,396 | Nowlin | Oct. 17, 1950 |
| 2,657,619 | Gilreath | Nov. 3, 1953 |
| 2,920,586 | Negreira | Jan. 12, 1960 |

FOREIGN PATENTS

| | | |
|---|---|---|
| 1,037,106 | France | Sept. 15, 1953 |
| 759,116 | Great Britain | Oct. 10, 1956 |